United States Patent
Sachkov et al.

(10) Patent No.: US 12,554,852 B2
(45) Date of Patent: Feb. 17, 2026

(54) METHOD AND A SYSTEM FOR DETECTING MALWARE ACTIVITY IN A .NET PLATFORM

(71) Applicant: F.A.C.C.T. NETWORK SECURITY LLC, Moscow (RU)

(72) Inventors: Ilya Konstantinovich Sachkov, Moscow (RU); Yury Alekseevich Tretyakov, Moscow (RU)

(73) Assignee: GROUP-IB GLOBAL PRIVATE LIMITED, Singapore (SG)

(*) Notice: Subject to any disclaimer, the term of this patent is extended or adjusted under 35 U.S.C. 154(b) by 160 days.

(21) Appl. No.: 18/536,826

(22) Filed: Dec. 12, 2023

(65) Prior Publication Data
US 2024/0202338 A1    Jun. 20, 2024

(30) Foreign Application Priority Data
Dec. 16, 2022    (RU) ................. 2022133041

(51) Int. Cl.
G06F 21/00    (2013.01)
G06F 21/54    (2013.01)
G06F 21/56    (2013.01)

(52) U.S. Cl.
CPC ............ G06F 21/566 (2013.01); G06F 21/54 (2013.01); G06F 21/568 (2013.01)

(58) Field of Classification Search
CPC ....... G06F 21/568; G06F 21/54; G06F 21/566
USPC ........................................................ 726/22
See application file for complete search history.

(56) References Cited

U.S. PATENT DOCUMENTS

| | | | |
|---|---|---|---|
| 8,954,929 B2 | 2/2015 | Braude | |
| 2009/0089766 A1* | 4/2009 | Day | G06F 9/45516 717/148 |
| 2012/0304160 A1* | 11/2012 | Soeder | G06F 9/4486 717/148 |
| 2015/0277867 A1 | 10/2015 | Hasabnis et al. | |
| 2016/0328221 A1 | 11/2016 | Soeder | |

(Continued)

FOREIGN PATENT DOCUMENTS

RU    2628920 C2    8/2017

OTHER PUBLICATIONS

"Common Language Runtime", Wikipedia, https://en.wikipedia.org/wiki/Common_Language_Runtime, retrieved on Dec. 9, 2023, pdf 2 pages.

(Continued)

Primary Examiner — Josnel Jeudy
(74) Attorney, Agent, or Firm — BCF LLP

(57) ABSTRACT

A method and a system for detecting malware activity in a .NET platform are provided. The method comprises: determining an architecture of the .NET platform; modifying contents of a given .NET method by adding thereto an executable payload, thereby generating a respective modified .NET method, the executable payload being configured for logging and storing data of current activities in the .NET platform; storing the respective modified .NET method in the .NET platform; in response to calling, by a .NET application, the respective modified .NET method: executing the executable payload to cause the logging the current activity in the .NET platform to generate an activity log; and transmitting the activity log for analysis to determine presence of the malware activity in the .NET platform.

18 Claims, 4 Drawing Sheets

(56) References Cited

U.S. PATENT DOCUMENTS

| | | | |
|---|---|---|---|
| 2021/0073015 A1 | 3/2021 | Dowling et al. | |
| 2021/0073374 A1 | 3/2021 | Mookken et al. | |
| 2023/0344838 A1* | 10/2023 | Rao | H04L 63/1416 |
| 2024/0403413 A1* | 12/2024 | Cohen | H04L 63/1483 |

OTHER PUBLICATIONS

"Common Intermediate Language", Wikipedia, https://en.wikipedia.org/wiki/Common_Intermediate_Language, retrieved on Dec. 9, 2023, pdf 8 pages.

"Just-in-time compilation", Wikipedia, https://en.wikipedia.org/wiki/Just-in-time_compilation, retrieved on Dec. 9, 2023, pdf 8 pages.

"Bytecode", Wikipedia, https://en.wikipedia.org/wiki/Bytecode, retrieved on Dec. 9, 2023, pdf 6 pages.

"Phrack Magazine", http://phrack.org/issues/70/6.html, retrieved on Dec. 9, 2023, pdf 31 pages.

"DotNetHooking", https://github.com/tandasat/DotNetHooking, retrieved on Dec. 9, 2023, pdf 5 pages.

"How do I intercept a method call in C#?", StackOverfow, https://stackoverflow.com/questions/25803/how-do-i-intercept-a-method-call-in-c, retrieved on Dec. 9, 2023, pdf 13 pages.

Wang, ".NET CLR Injection: Modify IL Code during Run-time", https://www.codeproject.com/Articles/463508/NET-CLR-Injection-Modify-IL-Code-during-Run-time, Aug. 2014, retrieved on Dec. 9, 2023, pdf 22 pages.

"Aspect-oriented programming", Wikipedia, https://en.wikipedia.org/wiki/Aspect-oriented_programming, retrieved on Dec. 9, 2023, pdf 17 pages.

"Assembly.Load Method", https://learn.microsoft.com/en-us/dotnet/api/system.reflection.assembly.load?view=net-7.0, retrieved on Dec. 9, 2023, pdf 13 pages.

Search Report with regard to RU Patent Application No. 2022133041 completed Oct. 27, 2023.

Search Report with regard to the NL Patent Application No. 2036480 issued Jul. 21, 2025.

Javaheri et al., "A Framework for Recognition and Confronting of Obfuscated Malwares Based on Memory Dumping and Filter Drivers", Wireless Pers Commun (2018) 98, pp. 119-137.

Dai et al., "DroidLogger: Reveal suspicious behavior of Android applications via instrumentation", 2012 7th International Conference on Computing and Convergence Technology (ICCCT), Seoul, 2012, pp. 550-555.

* cited by examiner

METHOD AND A SYSTEM FOR DETECTING MALWARE ACTIVITY IN A .NET PLATFORM

CROSS-REFERENCE

The present application claims priority to a Russian patent application No.: 2022133041, filed on Dec. 16, 2022, and entitled "A PROCESS AND A SYSTEM FOR INTERCEPTING .NET CALLS BY MEANS OF INTERMEDIATE LANGUAGE PATCHES," the content of which is incorporated herein by reference in its entirety.

FIELD

The present technology relates broadly to the field of cybersecurity, and in particular, to methods and systems of detecting malware activity in a .NET platform.

BACKGROUND

Cyber security experts predict that a number and technical complexity of cybercrimes will continue to increase. Intruders quickly adapt a malware to increase its effectiveness and to overcome existing methods for detecting and preventing malware attacks. In response to a technical advancement of the malware, technical means to prevent the malware attacks improve as well.

Most of conventional technologies for preventing cyberattacks focus on system calls interception: upon accessing the system calls, the intruders are enabled to perform potentially fraudulent activities, e.g., to steal authentication credentials, to encrypt a system hard drive etc. However, there is a type of malware having similar targets that can cause damage to a system without utilizing the system calls. For example, such malware can be developed using a .NET platform.

A detailed description of the .NET platform is available at the following link en.wikipedia.org/wiki/.NET_Framework. The .NET software platform has a set of legitimate functions that makes it possible to carry out a fraudulent activity. These operations may not use the system calls or any system API, or may use them at a very low level. With such an implementation, it may be challenging to understand what malicious activity was used. It may also be challenging to obtain any meaningful markers and artifacts of the fraudulent activity due to a significant modification and "truncated" data that reaches such a low level.

.NET or .NET Framework is a software platform released by Microsoft in 2002. The .NET platform has become a popular development environment, and it is often used on virtual machines due to its versatile functionality. The platform may be installed on different operating systems, and it supports use of a large list of programming languages, a list of Command Line Interface (CLI) languages is available at the following link en.wikipedia.org/wiki/List_of_CLI_languages. A basis of the platform is a Common Language Runtime (CLR) which is described in detail at the following link en.wikipedia.org/wiki/Common_Language_Runtime.

Any high-level language is compiled into an intermediate language before it is run in the .NET platform. The intermediate language is a programming language developed for the .NET platform, and a more detailed description of the intermediate language is available at the following link: en.wikipedia.org/wiki/Common_Intermediate_Language. Once compiled into an intermediate language code, the code is either executed by the CLR or translated by another utility into an executable code for a specific target processor. Use of a virtual machine may be advantageous, since it removes a need to use additional hardware. When using the CLR, a Just-in-Time (JIT) compiler built therein "on the fly" converts an intermediate bytecode into machine codes of a desired processor. The JIT compiler is described in detail at the following link en.wikipedia.org/wiki/Just-in-time_compilation. A description of the bytecode is available at the following link en.wikipedia.org/wiki/Bytecode. Modern dynamic compilation technology makes it possible to achieve a high level of speed performance. The CLR virtual machine is also responsible for a basic security, memory management, and exception system, obviating the need for at least a part of a developer's work.

As mentioned above, the CLR may have a set of legitimate functions that can be used by fraudsters. In particular, the 70th release of Phrack provides a step-by-step description of a process for implementing executable code injections in the CLR which makes it possible to gain a control of a .NET application and steal, for example, an authentication data. The description of this process is provided under the following link phrack.org/issues/70/6.html.

There have been proposed in art certain solution for preventing cyberattacks in the .NET software platform by means of interceptions. A description of one of the prior art method is available under the following link github.com/tandasat/DotNetHooking. This solution implements a .NET application protection by means of interceptions through monitoring and a forced generation of a final machine code that is executed by the processor. Then, a standard work with interceptions for system libraries, for example, WinAPI, is performed.

Use of .dll injection also appears to be widely known in the prior art. One example of this solution is available under the following link stackoverflow.com/questions/2804 3/how-do-i-intercept-a-method-call-in-c. In this solution, .NET methods are intercepted by means of Aspect Oriented Programming (AOP) and injection. A description of OAP is available at the following link en.wikipedia.org/wiki/Aspect-oriented_programming.

Another method proposed in the prior art to prevent the malware attacks in the .NET platform is codeproject.com/Articles/463084/NET-CLR-Injection-Modify-IL-Code-during-Run-time. However, this solution is directed to changing a behavior of the CLR, namely the JIT compiler, based on pdb files. The process does not work with system libraries such as mscorlib. In view of this, a major part of the .NET platform, for example, Native Image, remains without protection. Native Image is machine code images in the .NET platform, Native Image makes it possible to perform operations without using the JIT compiler. More information about Native Image can be found under the following link ru.wikipedia.org/wiki/Ngen.

SUMMARY

It is an object of the present technology to ameliorate at least some of the inconveniences associated with the prior art.

More specifically, unlike the prior art solutions reviewed above that, inter alia, are directed to performing the modification directly at a machine code level, the presently claimed methods and systems are directed to intercepting .NET calls by means of inserting, in an architecture of the .NET platform (such as .NET methods), program patches in the intermediate language. These patches can be configured to cause logging data of current activity executed in the .NET platform. Thus, when a given .NET application (which can potentially be malicious) calls a .NET method that has been modified to include the program patch, it will automatically trigger the logging of the current activity. The data of the current activity can further be analyzed to determine any presence of malware activity in .NET platform.

More specifically, in accordance with a first broad aspect of the present technology, there is provided a computer-implemented method for detecting malware activity in a .NET platform. The method comprises: during a preparation stage: determining an architecture of the .NET platform, the determining comprising: identifying a plurality of libraries in the .NET platform; determining, for each version of each library of the plurality of libraries, a respective class from a set of predetermined classes; determining, for each class of the predetermined set of classes, a respective .NET method of a set of predetermined .NET methods; modifying contents of a given .NET method of the set of predetermined .NET methods by adding thereto an executable payload, thereby generating a respective modified .NET method, the executable payload being configured for logging and storing data of current activities in the .NET platform; storing the respective modified .NET method in the .NET platform; in response to determining, in a native image directory of the architecture of the .NET platform, at least one native image library of one of the predetermined set of classes, hiding the at least one native image library in the native image directory; generating, for each one of the at least one native image library, a respective modified native image library having the executable payload; and adding respective modified native image libraries to the native image directory to be used instead of the at least one native image library; Further, during an operation stage, following the preparation stage, the method comprises: in response to calling, by a .NET application, at least one of: the respective modified .NET method and the respective modified native image library in the .NET platform: executing the executable payload to cause the logging the current activity in the .NET platform to generate an activity log; and transmitting the activity log for analysis to determine presence of the malware activity in the .NET platform.

In some implementations of the method, the set of predetermined classes comprises: Assembly; Process; and WebRequest.

In some implementations of the method, the set of predetermined .NET methods comprises: Load; GetProcesses; and Create.

In some implementations of the method, prior to the modifying the contents of the given .NET method, the method further comprises accessing the respective class of the given .NET method.

In some implementations of the method, the accessing the respective class comprises executing a takeown utility.

In some implementations of the method, the modifying the contents of the given .NET method comprises modifying a behavior thereof.

In some implementations of the method, prior to the hiding the at least one native image library in the native image directory, the method further comprises accessing the at least one native image library.

In some implementations of the method, the accessing the at least one native image library comprises executing a takeown utility.

In some implementations of the method, the generating the respective modified native image library comprises executing an ngen.exe utility.

In accordance with a second broad aspect of the present technology, there is provided a system for detecting malware activity in a .NET platform. The system comprises at least one processor and at least one non-transitory computer-readable medium storing executable instructions, which, when executed by the at least one processor, cause the system to: during a preparation stage: determine an architecture of the .NET platform, by: identifying a plurality of libraries in the .NET platform; determining, for each version of each library of the plurality of libraries, a respective class from a set of predetermined classes; determining, for each class of the predetermined set of classes, a respective .NET method of a set of predetermined .NET methods; modify contents of a given .NET method of the set of predetermined .NET methods by adding thereto an executable payload, thereby generating a respective modified .NET method, the executable payload being configured for logging and storing data of current activities in the .NET platform; store the respective modified .NET method in the .NET platform; in response to determining, in a native image directory of the architecture of the .NET platform, at least one native image library of one of the predetermined set of classes, hide the at least one native image library in the native image directory; generate, for each one of the at least one native image library, a respective modified native image library having the executable payload; and add respective modified native image libraries to the native image directory to be used instead of the at least one native image library. Further, during an operation stage, following the preparation stage, the at least one processor causes the system to: in response to calling, by a .NET application, at least one of: the respective modified .NET method and the respective modified native image library in the .NET platform: execute the executable payload to cause the logging the current activity in the .NET platform to generate an activity log; and transmit the activity log for analysis to determine presence of the malware activity in the .NET platform.

In some implementations of the system, the set of predetermined classes comprises: Assembly; Process; and WebRequest.

In some implementations of the system, the set of predetermined .NET methods comprises: Load; GetProcesses; and Create.

In some implementations of the system, prior to modifying the contents of the given .NET method, the at least one processor further causes the system to access the respective class of the given .NET method.

In some implementations of the system, to access the respective class comprises, the at least one processor causes the system to execute a takeown utility.

In some implementations of the system, by modifying the contents of the given .NET method, the at least one processor causes the system to modify a behavior of the given .NET method.

In some implementations of the system, prior to hiding the at least one native image library in the native image directory, the at least one processor causes the system to access the at least one native image library.

In some implementations of the system, to access the at least one native image library, the at least one processor causes the system to execute a takeown utility.

In some implementations of the system, to generate the respective modified native image library, the at least one processor causes the system to execute an ngen.exe utility.

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented, or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Further, in the context of the present specification, the terms below have the following respective definitions:

a patching, a patch is an automated introduction of certain code changes to an architecture of the .NET platform by adding/removing/changing its sections, such as classes or .NET methods;

a post-processing module is a set of software tools for collecting, processing and sending information in accordance with specified parameters;

an isolated environment is a virtual environment for malware analysis, such as VMware™ virtual environment;

a method (or otherwise ".NET method") is a function or a procedure within the architecture of the .NET platform that relates to a certain class or object; and a class is a model for creating objects of a certain type which describes their structure (a set of fields and their initial state) and defines algorithms (functions or .NET methods) for working with these objects.

BRIEF DESCRIPTION OF THE DRAWINGS

Non-limiting embodiments of the present technology are described herein with reference to the accompanying drawings; these drawings are only presented herein to explain the essence of the technology and are not intended to limit the scope thereof in any way, where.

DETAILED DESCRIPTION

The following detailed description is provided to enable a person skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiments of the present technology are directed to detecting malware activity in a given .NET platform by intercepting certain .NET calls received from .NET applications. In one example, the call interception may allow obtaining partial control of the operating system and to start logging current activity in the given .NET platform. This scenario can be useful, for example, for analyzing data of the current activity for detecting a malicious software activity in an isolated environment executing the given .NET platform.

In another example, the interception of the calls in the given .NET platform is used to change a behavior of an original function, for example, by replacing input parameters. So, if a parameter is replaced in the Assembly::Load (byte[ ]) .NET method of the given .NET platform, an assembly is changed, and it is subsequently loaded by means of an original method. Thus, calling the so modified function would result in changing the behavior of the malware or a specific assembly being loaded through the above-described method. Therefore, improvement of malware detectability can be achieved.

In yet another example, the behavior of the original function is changed by intercepting calls in the given .NET platform, for example, by changing a logic of the original function, thereby adding additional actions and/or removing the original ones. For example, in the Assembly::Load(byte[ ]) .NET method, in addition to logging input parameters, a logic for obtaining a process environment information can be added. This hence enables for collecting data about a process file being executed and its metainformation in response to a given .NET application calling the modified Assembly::Load(byte[ ]) .NET method. This makes it possible to get a detailed picture of which application (malware) has called the function under which circumstances.

Figure 1:
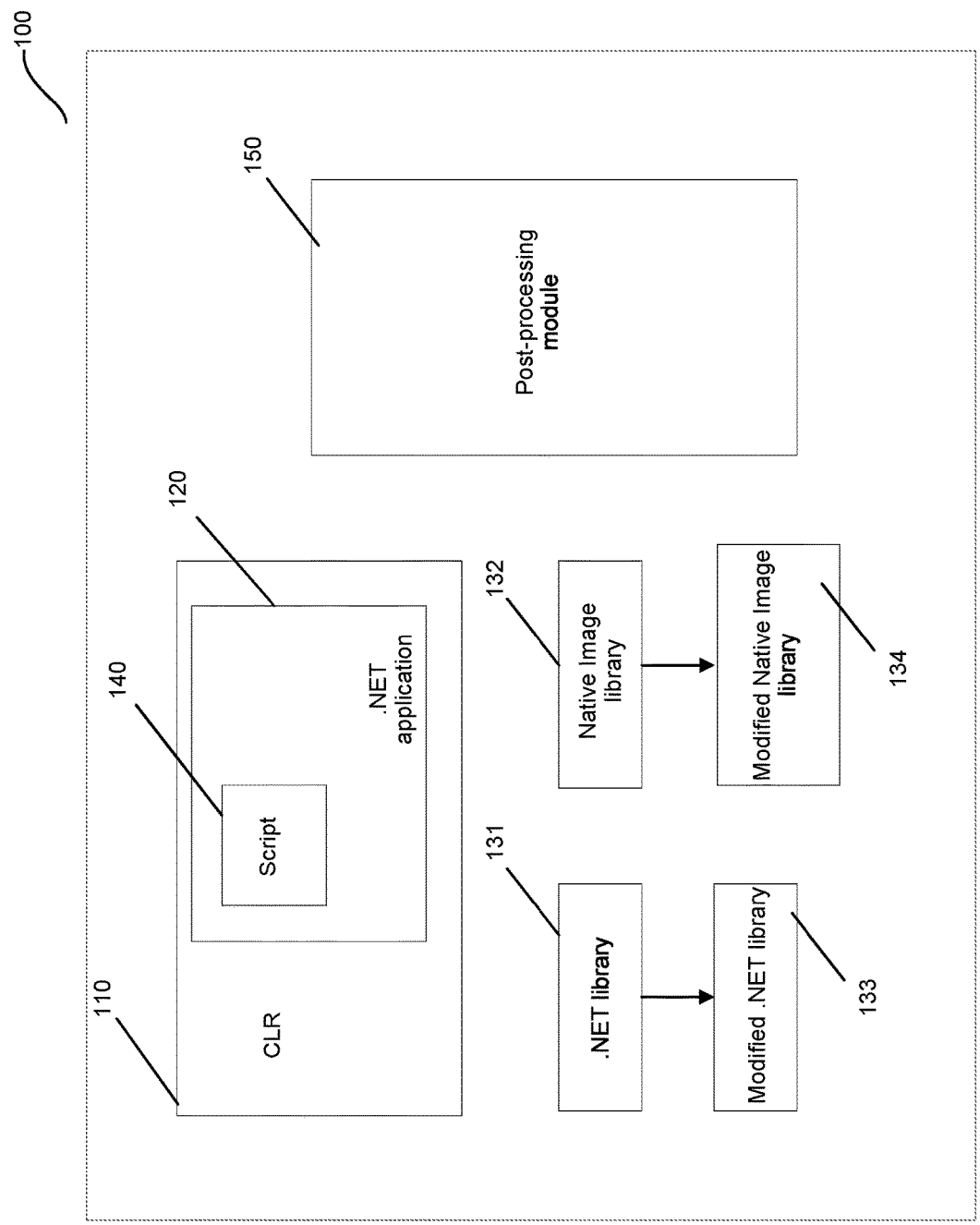
FIG. 1 depicts an example general diagram of a given .NET platform, in accordance with certain non-limiting embodiments of the present technology.

With reference to FIG. 1, there is depicted an example general diagram of a .NET platform 100. In some non-limiting embodiments of the present technology, the .NET platform 100 can be installed on a virtual machine within an isolated environment for malware analysis, which is executed by an electronic device (not depicted). In other non-limiting embodiments of the present technology, the .NET platform 100 can be installed directly on the electronic device. According to certain non-limiting embodiments of the present technology, the electronic device can comprise any computer hardware that is capable of running software appropriate to the relevant task at hand, such as a server, a personal computer, a laptop, or a tablet, as an example. In this regard, the electronic device executing the .NET platform 100 can include some or all components of a computing environment 400, which will be described in detail below with reference to FIG. 4.

Further, as best shown in FIG. 1, the .NET platform can be configured to execute a .NET application 110. A code of the .NET application 110 can be executed by means of a CLR 120. The code of the .NET application 110 comprises commands that call libraries of the .NET platform 100, such as a .NET library 131 and Native Images 132.

According to certain non-limiting embodiments of the present technology, a processor 401 of the electronic device associated with the .NET platform 100 can be configured to modify at least one library (such as the .NET library 131) and at least one Native Image (such as the Native Image 132). The modification results in obtaining at least one modified library such as a modified .NET library 133 and/or at least one modified Native Image 134. The modified libraries and the modified Native Images may include intermediate language patches (not depicted), and upon their execution, a desired behavior of the .NET platform 100 can be achieved. For example, by executing the intermediate language patches, the processor 401 can be configured to cause execution of one or more desired functions, such as, without limitation, events logging for subsequent malware analysis and malware activity detection.

Further, according to certain non-limiting embodiments of the present technology, the processor 401 can be configured to execute a post-processing module 150 configured to prepare and to transmit the generated logs for subsequent analysis.

According to certain non-limiting embodiments of the present technology, the present method for detecting the malware activity in the given .NET platform, such as the .NET platform 100, comprises two consecutively executed stages: a preparation stage 200 and an operation stage 300, which can be executed by the processor 401. The preparation stage 200 comprises executing the above-mentioned modification of the libraries by means of a patch. Also, the preparation stage 200 may further comprise modifying Native Images, if any Native Images are detected in the architecture of the .NET platform 100. The operation stage 300 comprises running the .NET application 100, thereby causing the execution of the patches. The preparation and operation phases 200, 300 will now be described in greater detail.

Figure 2:
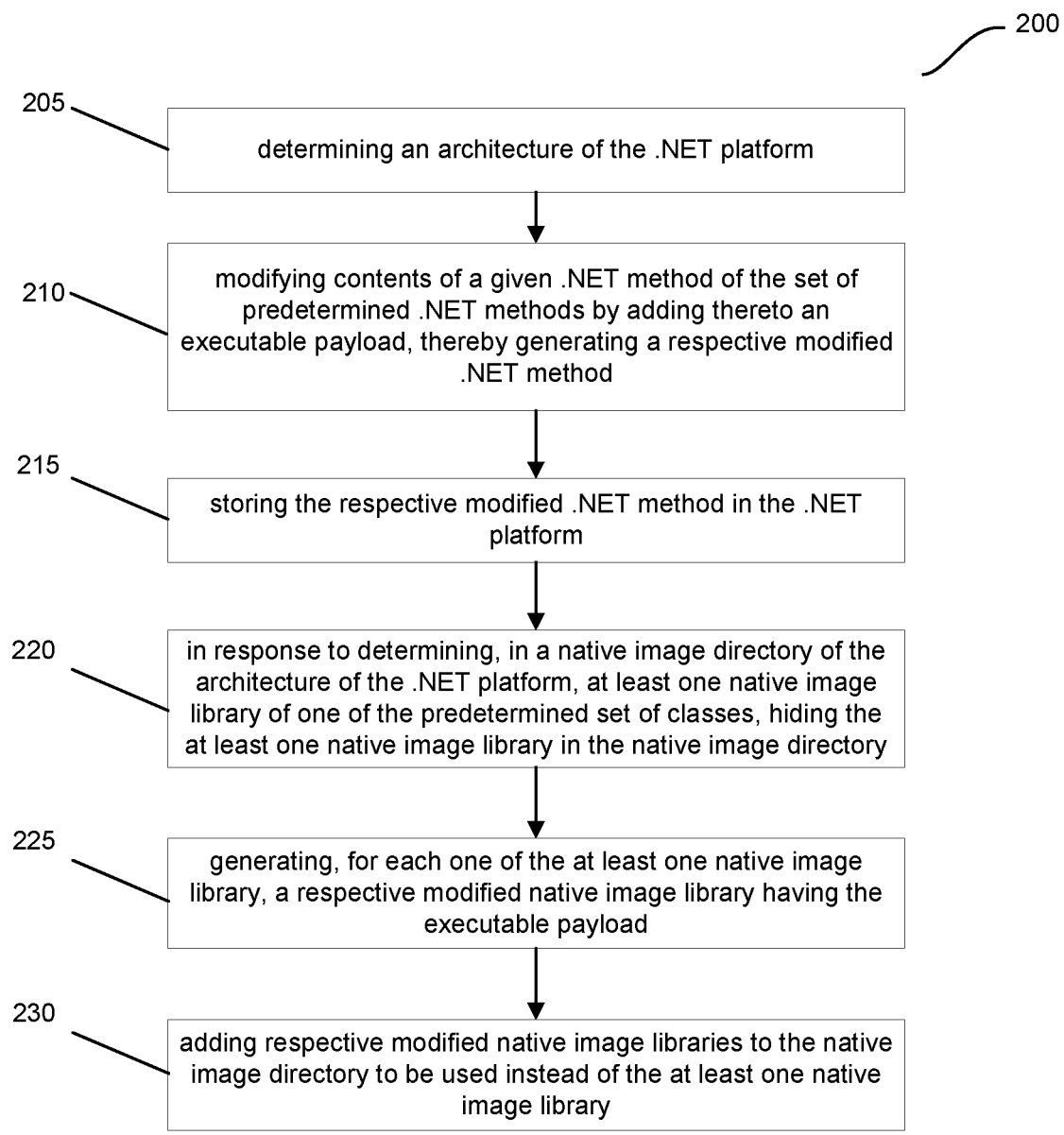
FIG. 2 depicts a flowchart diagram of a preparation stage of the present method for detecting malware activity in the given .NET platform of FIG. 1, in accordance with certain non-limiting embodiments of the present technology.

With reference to FIG. 2, there is depicted a flowchart diagram of the preparation stage 200, in accordance with certain non-limiting embodiments of the present technology. For the sake of simplicity and clarity of the present disclosure, the preparation stage 200 and the operation stage 300 will be described using an example of intercepting the Assembly Load .NET method of the mscorlib.dll library of the .NET platform 100. However, it should be noted that the present methods and system can be applied to any .NET methods of the .NET platform 100. Furthermore, the present methods and systems can be applied to multiple .NET libraries and .NET methods of the .NET platform 100 simultaneously.

Step 205: Determining an Architecture of the .NET Platform

The preparation stage 200 starts at step 205 where the processor 401 can be configured to determine the architecture of the .NET platform 100. To that end, according to certain non-limiting embodiments of the present technology, first, the processor 401 can be configured to identify a plurality of .NET platform libraries and all versions thereof. To do so, in some non-limiting embodiments of the present technology, the processor 401 can be configured to execute a pre-generated program script 140 configured to determine an architecture and a version of the installed operating system, a version of the installed .NET platform and, based on this data, determines all directories of possible locations of .NET libraries and versions thereof.

In some non-limiting embodiments of the present technology, the processor 401 can further be configured to access a given library, such as the .NET library 131.

For example, the processor 401, by executing the pre-generated program script 140, can be configured to identify, in the .NET platform 100, a .NET runtime directory, GAC32/64. The identified directory is stored in the memory of the computing environment 400. Further, the processor 401 can be configured to identify in the .NET runtime directory the .NET library 131 as being a mscorlib.dll library. Also, at step 205, the processor 401 can be configured to access the library mscorlib.dll, for example, by using a takeown utility. The takeown utility is configured to transfer rights for reading/executing/recording to any user. Other ways to access the given .NET library in the .NET platform 100 are envisioned.

Further, in some non-limiting embodiments of the present technology, the processor 401 can be configured to determine whether the .NET library 131 is of one from a set of predetermined classes. The set of predetermined classes, as well as the identification process, can be predetermined by the pre-generated program script 140 executed by the processor 401 for determining the architecture of the .NET platform 100. For example, the set of predetermined classes for the .NET libraries can include, without limitation: Assembly; Process; WebRequest class.

In the provided example, the processor 401 can be configured to determine that the .NET library 131 is of one of the set of predetermined classes being a System.Reflection.Assembly class. Subsequently, the processor 401 can be configured to save the so identified class in association with the .NET library 131.

Further, in some non-limiting embodiments of the present technology, for determining the architecture of the .NET platform 100, the processor 401 can be configured to determine whether .NET methods of a given class are of one of a set of predetermined set of .NET methods. Similarly, the set of predetermined .NET methods can be defined in the pre-generated program script 140. According to certain non-limiting embodiments of the present technology, the set of predetermined .NET methods can include, without limitation: Load; GetProcesses; and Create .NET methods.

In the above example, the processor 401 can be configured to identify, for the System.Reflection.Assembly class, the respective .NET method from the set of predetermined .NET methods as being the Load .NET method. Further, the processor 401 can be configured to save the so identified .NET method in association with the respective class.

Thus, using the pre-generated program script 140, the processor 401 can be configured to determine the architecture of the .NET platform 100 including .NET libraries, classes thereof, and associated .NET methods.

The preparation stage 200 hence advances to step 210.

Step 210: Modifying Contents of a Given .NET Method of the Set of Predetermined .NET Methods by Adding Thereto an Executable Payload, Thereby Generating a Respective Modified .NET Method At step 210, the processor 401 can be configured to modify a given one of the .NET methods to add thereto a program payload. More specifically, the processor 401 can be configured to add, to the given .NET method, a program patch in an intermediate language code.

Returning to the above example, the processor 401 can be configured to generate the program payload for modifying the Load method of the .NET library 131 as follows:

```
"Type type = Assembly.LoadFile("<PathToHookLib>").GetType("Hooks");
    type.GetMethod("<HookMethodName>").Invoke(null, new object[ ]
    {
    <here go all args of target method>
    });"
```

Further, the processor 401 can be configured to add the so generated program payload to the Load .NET method by executing the pre-generated program script 140. Different techniques for adding the payloads can be used depending on the version of .NET platform. For example, in the version 4 of the .NET platform, the processor 401 can be configured to add the payload by copying it into an individual, specially created .NET method.

Thus, only the payload remains in the original .NET method. Thus, during the operation stage 300, the payload is executed by calling a copy of the original .NET method. This implementation of adding the payload is determined by code safety attributes introduced in the version 4 of the .NET platform.

In the above example, the added payload is configured for triggering logging the current activity in the .NET platform 100 and transferring control from the .NET library 131 to the post-processing module 150. The post-processing module 150 may be a loadable library that converts received data into a predetermined format for further analysis.

The preparation stage 200 of the present method hence advances to step 215.

Step 215: Storing the Respective Modified .NET Method in the .NET Platform

At step 215, according to certain non-limiting embodiments of the present technology, the processor 401 can be configured to save the modified intermediate language code of the program payload in the given .NET method in the .NET library 131, thereby generating the modified .NET library 133. Further, the processor 401 can be configured to sign the program payload with a strong name to ensure unambiguity when referring to the code. The signing can be performed, for example, by means of a sn.exe utility.

The preparation stage 200 of the present method hence advances to step 220.

Step 220: In Response to Determining, in a Native Image Directory of the Architecture of the .NET Platform, at Least One Native Image Library of One of the Predetermined Set of Classes, Hiding the at Least One Native Image Library in the Native Image Directory At step 220, according to certain non-limiting embodiments of the present technology, by executing the pre-generated program script 140, the processor 401 can be configured to identify, in the .NET platform 100, Native Images, such as the Native Images 132 mentioned above. If the processor 401 fails to identify any Native Images, the preparation stage 200 terminates, and the present method proceeds directly to the operation stage 300.

However, if the processor 401 has identified a Native Image library of one of the set of predetermined classes mentioned above, such as the Native Images 132, the processor 401 can be configured to copy and hide the Native Images 132 from the respective Native Images directory.

Further, in some non-limiting embodiments of the present technology, the processor 401 can be configured to access the Native Image 132, for example, using the takeown utility.

Continuing with the above example, the processor 401 can be configured to (i) identify the Native Images 132 being of the System.Reflection.Assembly class; (ii) copy and hide the Native Inage 132 from the directories of the Native Images, for example, (v2 86/64, v4 86/64).

The preparation stage 200 thus advances to step 225.

Step 225: Generating, for Each One of the at Least One Native Image Library, a Respective Modified Native Image Library Having the Executable Payload At step 225, the processor 401 can be configured to apply, to the Native Images 13, changes similar to those that have been applied to the given .NET method as described at step 210.

More specifically, in the above example, the processor 401 can be configured to modify the System.Reflection.Assembly class from the Native Image library; and generate the at least one modified Native Image 134 based on the modified class. To do so, according to certain non-limiting embodiments of the present technology, the processor 401 can be configured to execute an Ngen.exe utility.

The preparation stage 200 hence advances to step 230.

Step 230: Adding Respective Modified Native Image Libraries to the Native Image Directory to be Used Instead of the at Least One Native Image Library At step 230, the processor 401 can be configured to replace the Native Images 132 with the at least one modified Native Image 134; and save these changes in the architecture of the .NET platform 100.

Figure 3:
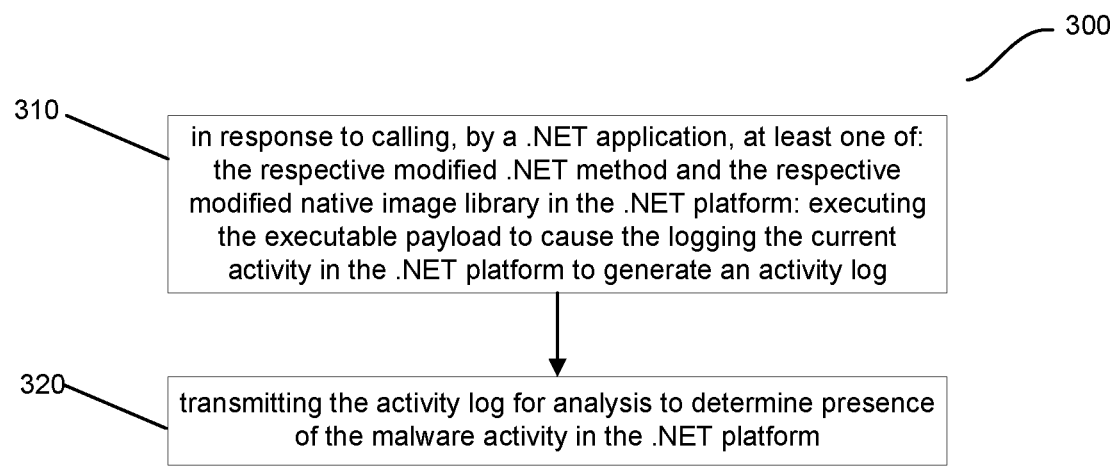
FIG. 3 depicts a flowchart diagram of an operation stage of the present method for detecting malware activity in the given .NET platform of FIG. 1, in accordance with certain non-limiting embodiments of the present technology.

The preparation stage 200 hence terminates, and the present method proceeds to the operation stage 300, a flowchart diagram is depicted in FIG. 3, in accordance with certain non-limiting embodiments of the present technology.

Step 310: In Response to Calling, by a .NET Application, at Least One of: The Respective Modified .NET Method and the Respective Modified Native Image Library in the .NET Platform: Executing the Executable Payload to Cause the Logging the Current Activity in the .NET Platform to Generate an Activity Log The operation stage 300 commences at step 310 where in response to calling, by a given .NET application, the .NET method (such as the Load method of the System.Reflection.Assembly class) from the modified .NET library 133, the processor 401 is configured to execute a predetermined action that is defined in the .NET method's payload.

In the above-mentioned example, the payload is as follows:

```
"Type type = Assembly.LoadFile("<PathToHookLib>").GetType("Hooks");
    type.GetMethod("<HookMethodName>").Invoke(null, new object[ ]
    {<here go all args of target method>});".
```

As a result of performing this payload, the control is transferred from the given .NET application to a module specified in the payload, for example, to the post-processing module 150.

In some non-limiting embodiments of the present technology, the predefined action specified in the payload, can comprise logging the current activity in the .NET platform 100. Thus, this action will be automatically triggered in response to the calling the .NET method from the modified library. By doing so, the processor 401 can be configured to generate an activity log including data representative of the current activity in the .NET platform 100.

The logging can be performed in any manner.

The operation stage 300 hence advances to step 320.

Step 320: Transmitting the Activity Log for Analysis to Determine Presence of the Malware Activity in the .NET Platform At step 320, the processor 401 can be configured to save the activity log (for example, in a data storage means 403 of the computing environment 400). In some non-limiting embodiments of the present technology, the processor 401 can further be configured to transmit the activity log for processing, for example, to the post-processing module 150. The transmission can be performed over a closed channel.

During the processing, by the post-processing module 150, the activity log can be analyzed for presence therein data indicative of the malicious activity. For example, the post processing module 150 can be configured to transmit the activity log to the isolated environment of the electronic device for analysis and detection of signs of malicious activity.

The operation stage 300 and the present method hence terminate.

Computing Environment

Figure 4:
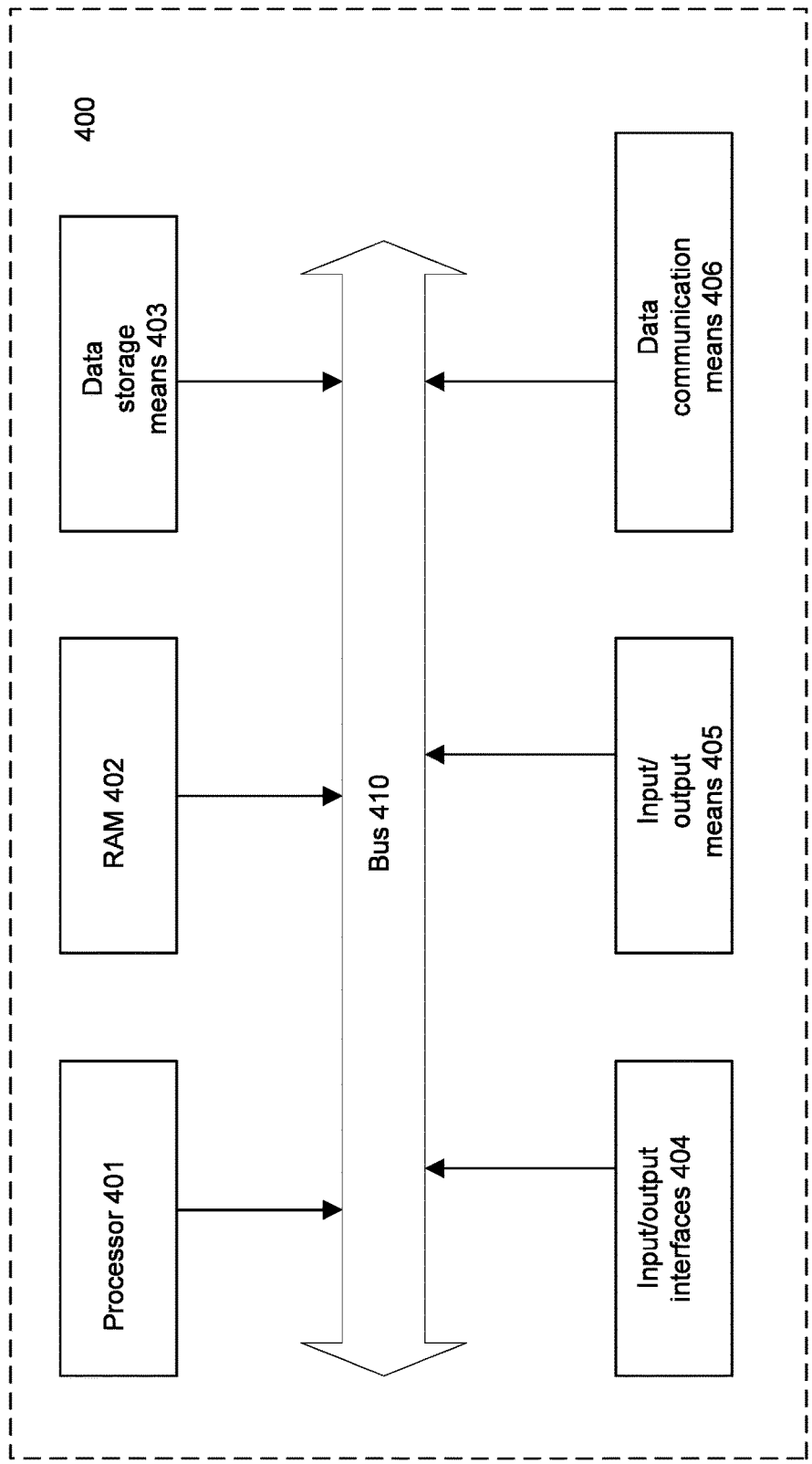
FIG. 4 depicts a schematic diagram of an example computing environment configurable for execution of the stages of the present method of FIGS. 2 and 3, in accordance with certain non-limiting embodiments of the present technology.

With reference to FIG. 4, there is depicted an example functional diagram of the computing environment 400 configurable to implement certain non-limiting embodiments of the present technology including the preparation and operation stages 200, 300 of the present method described above.

In some non-limiting embodiments of the present technology, the computing environment 400 may include: the processor 401 comprising one or more central processing units (CPUs), at least one non-transitory computer-readable memory 402 (RAM), a storage 403, input/output interfaces 404, input/output means 405, data communication means 406.

According to some non-limiting embodiments of the present technology, the processor 401 may be configured to execute specific program instructions the computations as required for the computing environment 400 to function properly or to ensure the functioning of one or more of its components. The processor 401 may further be configured to execute specific machine-readable instructions stored in the at least one non-transitory computer-readable memory 402, for example, those causing the computing environment 400 to execute the preparation and operation stages 200, 300 of the present method described above.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PUP, AWK, Python, Visual Basic, SQL Stored Procedures, PL/SQL, any UNIX shell scripts or XML. Various algorithms are implemented with any combination of the data structures, objects, processes, procedures, and other software elements.

The at least one non-transitory computer-readable memory 402 may be implemented as RAM and contains the necessary program logic to provide the requisite functionality.

The storage 403 may be implemented as at least one of an HDD drive, an SSD drive, a RAID array, a network storage, a flash memory, an optical drive (such as CD, DVD, MD, Blu-ray), etc. The storage 403 may be configured for long-term storage of various data, e.g., the aforementioned documents with user data sets, databases with the time intervals measured for each user, user IDs, etc.

The input/output interfaces 404 may comprise various interfaces, such as at least one of USB, RS432, RJ45, LPT, COM, HDMI, PS/2, Lightning, FireWire, etc.

The input/output means 405 may include at least one of a keyboard, joystick, (touchscreen) display, projector, touchpad, mouse, trackball, stylus, speakers, microphone, and the like. A communication link between each one of the input/output means 405 can be wired (for example, connecting the keyboard via a PS/2 or USB port on the chassis of the desktop PC) or wireless (for example, via a wireless link, e.g., radio link, to the base station, which is directly connected to the PC, e.g., to a USB port).

The data communication means 406 may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing environment 400 may be linked together using a common data bus 410.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for detecting malware activity in a .NET platform, the method comprising:

during a preparation stage:
determining an architecture of the .NET platform, the determining comprising:
identifying a plurality of libraries in the .NET platform;
determining, for each version of each library of the plurality of libraries, a respective class from a set of predetermined classes;
determining, for each class of the predetermined set of classes, a respective .NET method of a set of predetermined .NET methods;
modifying contents of a given .NET method of the set of predetermined .NET methods by adding thereto an executable payload, thereby generating a respective modified .NET method;
storing the respective modified .NET method in the .NET platform;
in response to determining, in a native image directory of the architecture of the .NET platform, at least one native image library of one of the predetermined set of classes, hiding the at least one native image library in the native image directory;

generating, for each one of the at least one native image library, a respective modified native image library having the executable payload, the executable payload being configured for logging and storing data of current activities in the .NET platform;

the logging comprising: (i) logging input parameters of the at least one of the respective modified .NET method and a respective modified native image library .NET method of the respective modified native image library; and (ii) logging metainformation of a respective process having caused execution of the executable payload; and adding respective modified native image libraries to the native image directory to be used instead of the at least one native image library; and during an operation stage, following the preparation stage:

in response to calling, by a .NET application, at least one of: the respective modified .NET method and the respective modified native image library .NET method of the respective modified native image library in the .NET platform:

executing the executable payload to cause the logging the current activity in the .NET platform to generate an activity log, the activity log including: (i) the input parameters of the at least one of the respective modified .NET method and the respective modified native image library NET method of the respective modified native image library; and (ii) metainformation of a process of the .NET application having caused the execution of the executable payload; and transmitting the activity log for analysis to determine presence of the malware activity in the .NET platform.

2. The computer-implemented method of claim 1, wherein the set of predetermined classes comprises:
Assembly;
Process; and
WebRequest.

3. The computer-implemented method of claim 1, wherein the set of predetermined .NET methods comprises:
Load;
GetProcesses; and
Create.

4. The computer-implemented method of claim 1, wherein, prior to the modifying the contents of the given .NET method, the method further comprises accessing the respective class of the given .NET method.

5. The computer-implemented method of claim 4, wherein the accessing the respective class comprises executing a takeown utility.

6. The method of claim 1, wherein, the modifying the contents of the given .NET method comprises modifying a behavior thereof.

7. The computer-implemented method of claim 1, wherein, prior to the hiding the at least one native image library in the native image directory, the method further comprises accessing the at least one native image library.

8. The computer-implemented method of claim 7, wherein the accessing the at least one native image library comprises executing a takeown utility.

9. The computer-implemented method of claim 1, wherein the generating the respective modified native image library comprises executing an ngen.exe utility.

10. A system for detecting malware activity in a .NET platform, the system comprising:
at least one hardware processor; and
at least one non-transitory computer-readable medium storing executable instructions, which, when executed by the at least one hardware processor, cause the system to:

during a preparation stage:
determine an architecture of the .NET platform, by:
identifying a plurality of libraries in the .NET platform;
determining, for each version of each library of the plurality of libraries, a respective class from a set of predetermined classes;
determining, for each class of the predetermined set of classes, a respective .NET method of a set of predetermined .NET methods;
modify contents of a given .NET method of the set of predetermined .NET methods by adding thereto an executable payload, thereby generating a respective modified .NET method;
store the respective modified .NET method in the .NET platform;
in response to determining, in a native image directory of the architecture of the .NET platform, at least one native image library of one of the predetermined set of classes, hide the at least one native image library in the native image directory;
generate, for each one of the at least one native image library, a respective modified native image library having the executable payload,
the executable payload being configured for logging and storing data of current activities in the .NET platform;
the logging comprising: (i) logging input parameters of the at least one of the respective modified .NET method and a respective modified native image library .NET method of the respective modified native image library; and (ii) logging metainformation of a respective process having caused execution of the executable payload; and
add respective modified native image libraries to the native image directory to be used instead of the at least one native image library; and during an operation stage, following the preparation stage:
in response to calling, by a .NET application, at least one of: the respective modified .NET method and the respective modified native image library .NET method of the respective modified native image library in the .NET platform:
execute the executable payload to cause the logging the current activity in the .NET platform to generate an activity log,
the activity log including: (i) the input parameters of the at least one of the respective modified .NET method and the respective modified native image library .NET method of the respective modified native image library; and (ii) metainformation of a process of the .NET application having caused the execution of the executable payload; and
transmit the activity log for analysis to determine presence of the malware activity in the .NET platform.

11. The system of claim 10, wherein the set of predetermined classes comprises:

Assembly;
Process; and
WebRequest.

12. The system of claim 10, wherein the set of predetermined .NET methods comprises:
Load;
GetProcesses; and
Create.

13. The system of claim 10, wherein, prior to modifying the contents of the given .NET method, the at least one hardware processor further causes the system to access the respective class of the given .NET method.

14. The system of claim 13, wherein to access the respective class comprises, the at least one hardware processor causes the system to execute a takeown utility.

15. The system of claim 10, wherein, by modifying the contents of the given .NET method, the at least one hardware processor causes the system to modify a behavior of the given .NET method.

16. The system of claim 10, wherein, prior to hiding the at least one native image library in the native image directory, the at least one hardware processor causes the system to access the at least one native image library.

17. The system of claim 16, wherein to access the at least one native image library, the at least one hardware processor causes the system to execute a takeown utility.

18. The system of claim 10, wherein to generate the respective modified native image library, the at least one hardware processor causes the system to execute an ngen.exe utility.

* * * * *